(12) United States Patent
Abdukalykov et al.

(10) Patent No.: US 9,658,672 B2
(45) Date of Patent: May 23, 2017

(54) BUSINESS OBJECT REPRESENTATIONS AND DETAIL BOXES DISPLAY

(75) Inventors: Rolan Abdukalykov, Montreal (CA); Alain Gauthier, Montreal (CA); Roy Ghorayeb, Montreal (CA); Vincent Lavoie, Montreal (CA); Xuebo Liang, Brossard (CA); Mohannad El-Jayousi, L'lle-Bizard (CA)

(73) Assignee: SAP SE, Walldorf (DE)

( * ) Notice: Subject to any disclaimer, the term of this patent is extended or adjusted under 35 U.S.C. 154(b) by 24 days.

(21) Appl. No.: 13/561,888

(22) Filed: Jul. 30, 2012

(65) Prior Publication Data
US 2014/0028730 A1    Jan. 30, 2014

(51) Int. Cl.
*G09G 5/00* (2006.01)
*G06F 1/32* (2006.01)
*G06F 3/0488* (2013.01)
*G06F 3/0484* (2013.01)
*G06Q 10/06* (2012.01)
*G06Q 10/10* (2012.01)

(52) U.S. Cl.
CPC .............. *G06F 1/32* (2013.01); *G06F 3/0488* (2013.01); *G06F 3/04842* (2013.01); *G06Q 10/06* (2013.01); *G06Q 10/109* (2013.01); *Y02P 80/10* (2015.11)

(58) Field of Classification Search
None
See application file for complete search history.

(56) References Cited

U.S. PATENT DOCUMENTS

| | | |
|---|---|---|
| 5,323,314 A | 6/1994 | Baber et al. |
| 5,745,110 A | 4/1998 | Ertemalp |
| 5,867,163 A | 2/1999 | Kurtenbach |

(Continued)

FOREIGN PATENT DOCUMENTS

| | | |
|---|---|---|
| AU | 2011101579 A4 | 2/2012 |
| EP | 1696301 A1 | 8/2006 |

(Continued)

OTHER PUBLICATIONS

Anonymous: "Google Calendar—Revision as of 16:55, Apr. 17, 2012," Apr. 17, 2012, pp. 1-7, Gustavus Adolphus College, retrieved from the Internet: URL:https://gustavus.edu/gts/w/index.php?title=Google_Calendar&oldid=24920 [retrieved on Jan. 10, 2014].

(Continued)

*Primary Examiner* — Barry Drennan
*Assistant Examiner* — Khoa Vu
(74) *Attorney, Agent, or Firm* — Jones Day

(57) ABSTRACT

A reference point on a graphical user interface may be determined. The reference point may be represented by a plurality of coordinates. The graphical user interface may be divided into tile map entities. Information about the tile map entities may be stored into a cache. The stored information may include an origin and dimensions of each tile map entity, and the origin may be represented relative to the reference point. Information needed to position a business object visual representation may be retrieved from the cache. The business object visual representation may be drawn on the graphical user interface based on the retrieved information needed to position the business object visual representation.

21 Claims, 5 Drawing Sheets

(56) References Cited

U.S. PATENT DOCUMENTS

| | | | |
|---|---|---|---|
| 5,898,431 A | 4/1999 | Webster et al. |
| 6,054,989 A | 4/2000 | Robertson et al. |
| 6,201,554 B1 | 3/2001 | Lands |
| 6,380,953 B1 | 4/2002 | Mizuno |
| 6,674,450 B1 | 1/2004 | Toub et al. |
| 6,915,490 B1 | 7/2005 | Ewing |
| 7,050,056 B2 | 5/2006 | Meyringer |
| 7,168,045 B2 | 1/2007 | Fliess et al. |
| 7,225,285 B1 | 5/2007 | Fairman et al. |
| 7,340,484 B2 | 3/2008 | S et al. |
| 7,421,645 B2 | 9/2008 | Reynar |
| 7,546,577 B2 | 6/2009 | Do et al. |
| 7,603,381 B2 | 10/2009 | Burke et al. |
| 7,739,695 B2 | 6/2010 | Wood et al. |
| 7,908,584 B2 | 3/2011 | Singh et al. |
| 8,024,666 B2 | 9/2011 | Thompson |
| 8,191,003 B2 | 5/2012 | Brown et al. |
| 8,214,748 B2 | 7/2012 | Srikanth et al. |
| 8,402,480 B2 | 3/2013 | Rohwer |
| 8,788,303 B1 | 7/2014 | Krone et al. |
| 8,812,546 B1 | 8/2014 | Cornali |
| 2001/0042059 A1 | 11/2001 | Uehara et al. |
| 2002/0091586 A1 | 7/2002 | Wakai et al. |
| 2002/0130899 A1* | 9/2002 | Ryan et al. | 345/738 |
| 2002/0158969 A1 | 10/2002 | Gupta |
| 2003/0058287 A1 | 3/2003 | Stanley |
| 2003/0066032 A1 | 4/2003 | Ramachandran et al. |
| 2003/0120621 A1 | 6/2003 | McDaniel et al. |
| 2003/0160815 A1 | 8/2003 | Muschetto |
| 2003/0182210 A1 | 9/2003 | Weitzman et al. |
| 2003/0229848 A1 | 12/2003 | Arend et al. |
| 2004/0001092 A1* | 1/2004 | Rothwein | G06F 8/38 715/763 |
| 2004/0252134 A1* | 12/2004 | Bhatt et al. | 345/619 |
| 2005/0050010 A1 | 3/2005 | Linden |
| 2005/0144038 A1 | 6/2005 | Tamblyn et al. |
| 2005/0171410 A1 | 8/2005 | Hjelt et al. |
| 2005/0197998 A1 | 9/2005 | Asbury |
| 2005/0262452 A1 | 11/2005 | Sauermann |
| 2005/0278217 A1 | 12/2005 | Adams et al. |
| 2005/0278354 A1 | 12/2005 | Gupta et al. |
| 2005/0278372 A1 | 12/2005 | Shaburov et al. |
| 2005/0289202 A1 | 12/2005 | S et al. |
| 2006/0036568 A1 | 2/2006 | Moore et al. |
| 2006/0069666 A1 | 3/2006 | Burke et al. |
| 2006/0089877 A1 | 4/2006 | Graziano et al. |
| 2006/0206522 A1 | 9/2006 | Austin et al. |
| 2006/0238538 A1* | 10/2006 | Kapler et al. | 345/440 |
| 2006/0242121 A1 | 10/2006 | DeVorchik et al. |
| 2006/0268742 A1 | 11/2006 | Chu et al. |
| 2007/0064022 A1 | 3/2007 | Silverbrook et al. |
| 2007/0156430 A1 | 7/2007 | Kaetker et al. |
| 2007/0180377 A1 | 8/2007 | Gittelman et al. |
| 2007/0199006 A1* | 8/2007 | Mukundan | G06F 9/547 719/330 |
| 2007/0211056 A1* | 9/2007 | Chakraborty et al. | 345/440 |
| 2007/0219842 A1 | 9/2007 | Bansal et al. |
| 2007/0233539 A1 | 10/2007 | Suenderhauf et al. |
| 2007/0239351 A1 | 10/2007 | Sherrill et al. |
| 2007/0244875 A1 | 10/2007 | Bodin et al. |
| 2007/0268246 A1 | 11/2007 | Hyatt |
| 2007/0288283 A1 | 12/2007 | Fitzpatrick |
| 2008/0040684 A1* | 2/2008 | Crump | 715/808 |
| 2008/0077549 A1 | 3/2008 | Glania et al. |
| 2008/0114625 A1 | 5/2008 | Kline et al. |
| 2008/0120129 A1 | 5/2008 | Seubert et al. |
| 2008/0141142 A1 | 6/2008 | Lyle et al. |
| 2008/0148190 A1 | 6/2008 | Schaff |
| 2008/0163125 A1 | 7/2008 | Gu et al. |
| 2008/0163126 A1 | 7/2008 | Rao |
| 2008/0168397 A1 | 7/2008 | Nelson |
| 2008/0178101 A1 | 7/2008 | Rode et al. |
| 2008/0178500 A1 | 7/2008 | Teuteberg |
| 2008/0195969 A1 | 8/2008 | Brown et al. |
| 2008/0221946 A1 | 9/2008 | Balon |
| 2008/0294994 A1 | 11/2008 | Kruger et al. |
| 2008/0307314 A1 | 12/2008 | Cisler et al. |
| 2008/0307323 A1 | 12/2008 | Coffman et al. |
| 2008/0313005 A1 | 12/2008 | Nessland et al. |
| 2008/0319818 A1 | 12/2008 | Gurdin et al. |
| 2008/0320558 A1 | 12/2008 | Imanishi et al. |
| 2009/0049372 A1 | 2/2009 | Goldberg |
| 2009/0076878 A1 | 3/2009 | Woerner et al. |
| 2009/0158173 A1 | 6/2009 | Palahnuk et al. |
| 2009/0174680 A1 | 7/2009 | Anzures et al. |
| 2009/0254370 A1 | 10/2009 | Kondo et al. |
| 2009/0254597 A1 | 10/2009 | Karoji |
| 2009/0293074 A1 | 11/2009 | Rohwer |
| 2009/0313268 A1 | 12/2009 | Folting et al. |
| 2010/0030783 A1 | 2/2010 | Ho et al. |
| 2010/0099462 A1 | 4/2010 | Baek et al. |
| 2010/0131889 A1 | 5/2010 | Helmolt et al. |
| 2010/0138334 A1 | 6/2010 | Warsaw et al. |
| 2010/0145936 A1 | 6/2010 | Grinstein et al. |
| 2010/0251954 A1 | 10/2010 | Yamada |
| 2010/0318640 A1 | 12/2010 | Mehta et al. |
| 2010/0325582 A1 | 12/2010 | Bansal et al. |
| 2010/0333014 A1 | 12/2010 | Fritzley et al. |
| 2011/0029521 A1 | 2/2011 | Thayne et al. |
| 2011/0072394 A1 | 3/2011 | Victor |
| 2011/0078016 A1 | 3/2011 | Wagenblatt et al. |
| 2011/0078058 A1 | 3/2011 | Wagenblatt et al. |
| 2011/0078171 A1 | 3/2011 | Wagenblatt et al. |
| 2011/0087708 A1 | 4/2011 | Teichmann et al. |
| 2011/0099500 A1 | 4/2011 | Smith et al. |
| 2011/0153629 A1 | 6/2011 | Lehmann et al. |
| 2011/0157005 A1 | 6/2011 | Inoue |
| 2011/0167369 A1 | 7/2011 | van Os |
| 2011/0167382 A1 | 7/2011 | van Os |
| 2011/0179368 A1 | 7/2011 | King et al. |
| 2011/0269435 A1 | 11/2011 | Dieckman |
| 2011/0276351 A1 | 11/2011 | Kondo et al. |
| 2011/0283242 A1 | 11/2011 | Chew et al. |
| 2011/0289422 A1 | 11/2011 | Spivack et al. |
| 2011/0298830 A1 | 12/2011 | Lam |
| 2012/0011426 A1 | 1/2012 | Yach |
| 2012/0032877 A1 | 2/2012 | Watkins, Jr. et al. |
| 2012/0036091 A1 | 2/2012 | Cook |
| 2012/0036485 A1 | 2/2012 | Watkins, Jr. et al. |
| 2012/0052921 A1 | 3/2012 | Lim et al. |
| 2012/0079408 A1 | 3/2012 | Rohwer |
| 2012/0105484 A1 | 5/2012 | Cui |
| 2012/0117493 A1 | 5/2012 | Gu et al. |
| 2012/0131496 A1 | 5/2012 | Goossens et al. |
| 2012/0159402 A1 | 6/2012 | Nurmi et al. |
| 2012/0174013 A1 | 7/2012 | Kraus et al. |
| 2012/0198369 A1 | 8/2012 | Sorin et al. |
| 2012/0253869 A1 | 10/2012 | Ansley |
| 2012/0284637 A1 | 11/2012 | Boyer et al. |
| 2012/0304121 A1* | 11/2012 | Cahill | G06F 3/0481 715/815 |
| 2012/0311475 A1 | 12/2012 | Wong |
| 2013/0038625 A1 | 2/2013 | Nakajima |
| 2013/0074003 A1 | 3/2013 | Dolenc |
| 2013/0085961 A1 | 4/2013 | Naghshin et al. |
| 2013/0144880 A1 | 6/2013 | Kemmer et al. |
| 2013/0290340 A1 | 10/2013 | Suermondt et al. |
| 2013/0321340 A1 | 12/2013 | Seo et al. |
| 2014/0036639 A1 | 2/2014 | Boni et al. |
| 2014/0109015 A1 | 4/2014 | Farn |
| 2014/0225897 A1 | 8/2014 | Sarrazin et al. |

FOREIGN PATENT DOCUMENTS

| | | |
|---|---|---|
| EP | 1837736 A2 | 9/2007 |
| EP | 2330470 A1 | 6/2011 |
| JP | 2009050937 A | 3/2009 |
| WO | 2009121227 A1 | 10/2009 |

OTHER PUBLICATIONS

Google: "Android 2.3.4 User's Guide," googleusercontent.com, May 20, 2011, Retrieved on Oct. 10, 2013 from the Internet:

(56) References Cited

OTHER PUBLICATIONS

URL:http://static.googleusercontent.com/external_content/untrusted_dlcp/www.google.com/en//help/hc/pdfs/mobile/AndroidUsersGuide-2.3.4.pdf.

SEAVUS Project Viewer 4.1, User Manual, 2009—Section 3.7 (groups) 3.6 (filters).

"Active Knowledge Modeling—Architect Your Business—12 Different Ways to Model Business Processes," http://activeknowledgemodeling.com/2009/03/31/12-different-ways-to-model-business-processes/, Mar. 31, 2009, 8 pages.

"Layer Container," http://homepage.mac.com/dlemmermann/DLSC/manual/components/layercontainer/layercontainer.html, 2007, 2 pages.

IBM TDB and Torres, R.J. "Zooming on Visual Calendar Data," IPCOM Prior Art Database, http://ip.com/IPCOM/000121803, Sep. 1, 1991, 2 pages.

Burigat et al., "Visualizing references to off-screen content on mobile devices: A comparison of Arrows, Wedge, and Overview + Detail," Interacting With Computers, 2011 Elsevier B.V., pp. 156-166.

Arsanjani, Ali, "Rule Object 2001: A Pattern Language for Adaptive and Scalable Business Rule Construction", IBM National EAD Center of Competency [online], [retrieved on May 16, 2014], Retrieved from the Internet (URL: http://citeseerx.ist.psu.edu/viewdoc/download?doi=10.1.1.202.6970&,rep=rep1&type=pdf), 2001.

Office Action, dated Feb. 4, 2015, from EP Application No. 13178606.3 filed Jul. 30, 2013.

Tri-State Tree View Control for .NET 1.1—Code Project, Dec. 14, 2007, 10 pages, http://www.codeproject.com/Articles/22116/Tri-State-Tree-View-Control-for-NET.

Telerik XAMLflix Tree View—Part 4: Implement a Tri-state CheckBox Using MVVM, YouTube video published Apr. 24, 2012 with 7 screenshots, https://www.youtube.com/watch?v=xlyj7-kv7_w.

Tri-State Tree View Control—CodeProject, Nov. 2, 2005, 7 pages, http://www.codeproject.com/Articles/6549/Tri-State-TreeView-Control.

Tri-State Tree View—CodeProject, May 30, 2011, 17 pages, http://www.codeproject.com/Articles/202435/Tri-State-Tree-View.

Office Action, dated Feb. 8, 2016, from EP Application No. 13178606.3 filed Jul. 30, 2013.

* cited by examiner

| Tile Map Entity Key 402 | Tile Map Entity Type 404 | Tile Map Entity Origin 406 | Tile Map Entity Dimension 408 | Tile Map Entity Start/End Attribute 412 |
|---|---|---|---|---|
| 1_R 422 | Row 424 | 0,100 426 | 1920,50 428 | null 432 |
| 30072011_15082011 | Column | 320,100 | 320,750 | 30/07/2011 – 15/08/2011 |
| ...... | | | | |

FIG. 4
400

BUSINESS OBJECT REPRESENTATIONS AND DETAIL BOXES DISPLAY

BACKGROUND

Business software such as enterprise resource planning (ERP) software implements business processes by modeling business data as business objects (BOs) with data exchange between the BOs. The business data provided via BOs can be accessed through mechanisms such as graphical user interfaces (GUIs), forms, and analytical reports.

Traditionally, GUIs providing access to BOs conveyed limited information about the attributes associated with the BOs. In addition, the information presented by the GUIs were not drawn/rendered in an efficient manner.

BRIEF DESCRIPTION OF THE DRAWINGS

FIG. 4 illustrates a cache/table to store details of tile map entities according to an embodiment.

DETAILED DESCRIPTION

Figure 1:
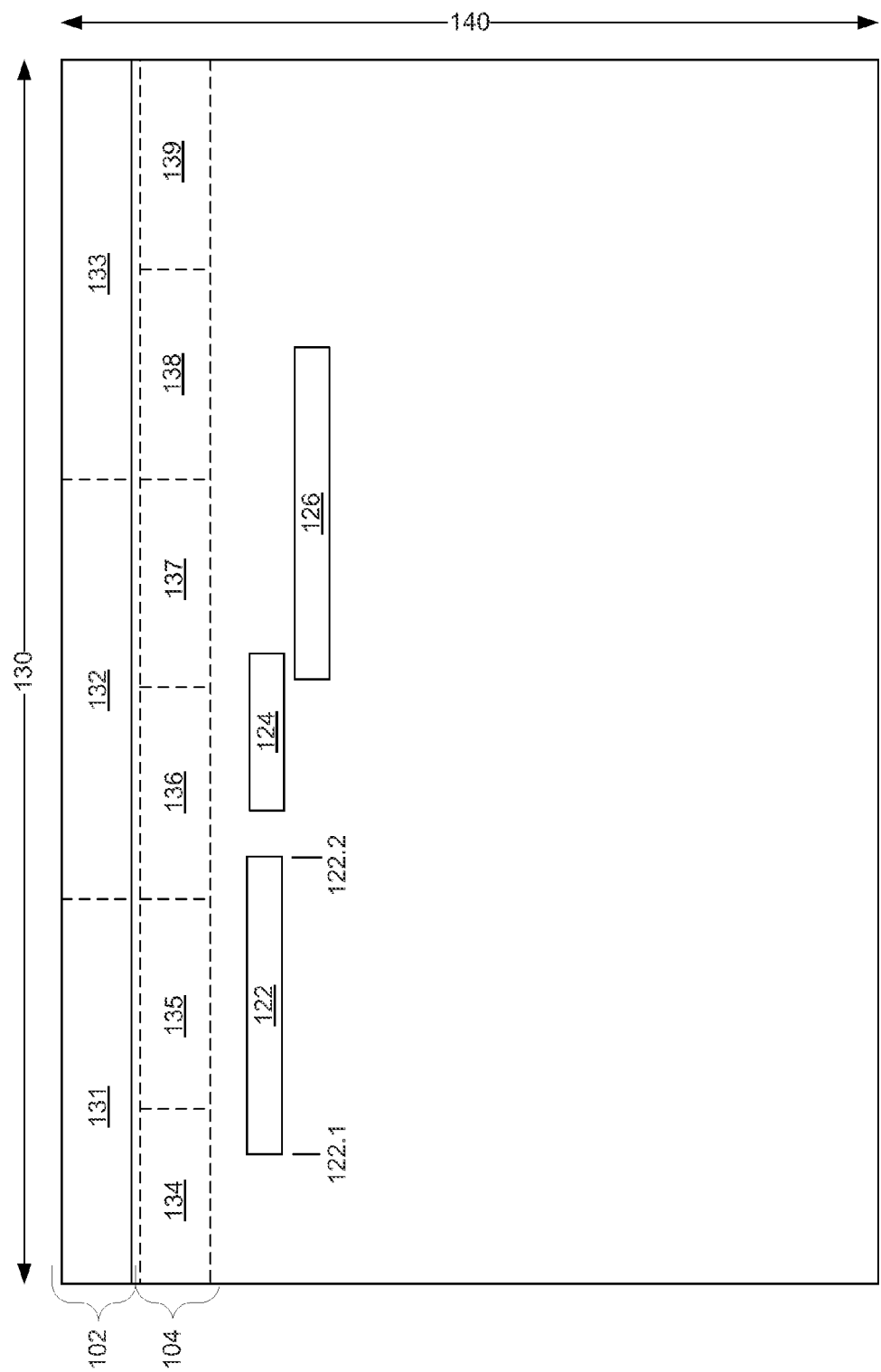
FIG. 1 illustrates a GUI to display BOs according to an embodiment.

Embodiments may be discussed in systems to efficiently display information about BOs. In an embodiment, a reference point on a graphical user interface may be determined. The reference point may be represented by coordinates. The graphical user interface may be divided into tile map entities. Information about the tile map entities may be stored into a cache. The stored information may include an origin and dimensions of each tile map entity, and the origin may be represented relative to the reference point. Information needed to position a business object visual representation may be retrieved from the cache. The business object visual representation may be drawn on the graphical user interface based on the retrieved information needed to position the business object visual representation.

In an embodiment, function(s) may be assigned to user action(s) associated with the business object visual representation. The function(s) may be executed in response to the user action(s). In an embodiment, information needed to position a detail box corresponding to the business object visual representation may be retrieved from the cache. The detail box may be drawn on the graphical user interface based on the retrieved information needed to position the detail box. In an embodiment, label(s) corresponding to each detail associated with the detail box may be drawn. In an embodiment, label(s) may be truncated based on dimensions of the detail box. In an embodiment, function(s) may be assigned to user action(s) associated with the label(s). The function(s) may be executed in response to the user action(s).

Business software usually includes a standard set of BOs which can be utilized by the software user to model a business entity. For example, in an embodiment, business software may include BOs representing business entities such as business promotions (trade promotions), sales orders, sales quotes, customer quotes, service documents, business opportunities, etc. Each BO may include attributes which define metadata associated with the BO. For example, a business promotion BO may represent a business promotion offered by a first company through a second company to consumers. The first company may be a soft drink company and the second company may be a major retailer. The promotion may have a start date and an end date (a promotion period). The promotion may offer the product, for example, a soft drink, for the promotion period at a particular sale price. The business promotion BO may include attributes such as the name of the second company, the size of the second company, the type of the second company, the name of the promotion product, the sale price of the product during the promotion, the price of the product without the promotion, the quantity of the product sold during the promotion, the start date of the promotion, and the end date of the promotion.

Attributes of BOs may indicate a range of values. For example, in an embodiment, a business promotion BO may include one or more attributes indicating the time period for which the business promotion is valid. The time period may be implemented by either defining a single time period attribute associated with the business promotion BO or by defining a start date attribute and an end date attribute associated with the business promotion BO. Similarly, in another example embodiment, the business promotion may only apply if particular quantities of a product are purchased. Therefore, the business promotion BO may include one or more attributes indicating a range of quantities to which the business promotion applies to.

FIG. 1 illustrates a GUI 100 to display BOs according to an embodiment. In an embodiment, BOs may be displayed on a GUI 100 in an organized manner to visually convey information about the BOs. The GUI 100 may display one or more scales 102, 104 on the x-axis 130 and/or y-axis 140. The GUI 100 may display visual representations of BOs such as 122, 124, and 126 mapped in relationship to the attributes on the x-axis 130 and/or y-axis 140.

In an embodiment, the attribute(s) displayed across the x-axis 130 and/or y-axis 140 may be presented as one or more scales displaying attribute values (for example, 102 and 104). In an embodiment, if multiple scales are presented on a particular axis, each scale may be graduated based on different granularities. For example, scales 102 and 104 may represent time periods. Scale 102 may be graduated into year units. Specifically, each of 131, 132, and 133 may represent a year. Scale 104 may be graduated on a semi-annual basis. Specifically, 134-139 may each represent half of a year.

In an embodiment, there may be a correlation between the multiple scales on a particular axis. For example, there may be a correlation between the units of scale 102 and scale 104. Time period 131 on scale 102 may represent a particular year, such as year 2012. The time period 134 may represent the first half of the year 2012, and the time period 135 may represent the second half of year 2012. In an embodiment the correlated portions of multiple scales may be presented directly above/below (x-axis) or directly beside (y-axis) each other. For example, time period 131 may be located directly above/below corresponding time periods 134 and 135.

The scale(s) displayed on the x-axis and/or y-axis 102 and 104 may be a range of contiguous values and/or discrete values. For example, the scales 102 and 104 may represent a contiguous time period of three years, a contiguous price range between zero Canadian dollars and 30 Canadian dollars, a contiguous temperature range between 0 degrees Fahrenheit and 90 degrees Fahrenheit, etc. In another example, the scales 102 may represent discrete products such as car A (131), car B (132) and car C (133).

In an embodiment, one or more scales (not shown) may be presented on the y-axis 140. The y-axis scale(s) may be presented and function similar to the x-axis scale(s) described above. Although only two axes (x and y) are illustrated in FIG. 1, a person having ordinary skill in the art will appreciate that GUI 100 may be extended to display additional axes. For example, a z-axis (with corresponding scale(s)) may be displayed by utilizing shading to show the third dimension. In a further example, the z-axis (with corresponding scale(s)) may be presented by displaying GUI 100 on a display which is 3-dimension (3D) compatible.

In an embodiment, the BO(s) displayed on the GUI 100 may be positioned and presented based on respective attribute value(s) of the BO(s) relative to the x-axis and/or y-axis scale(s) of GUI 100. In an example embodiment, scale 102 may be displayed on the GUI 100 and may indicate a time period range as explained above. BOs 122, 124, and 126 may be visual representations of business promotion BOs. Each BO represented by 122, 124, and 126 may include attributes indicating the business promotion period of the respective business promotion BO. The BO visual representations 122, 124, and 126 may be presented to visually convey the span of the business promotion periods, and the start/end of the business promotion periods. For example, time periods 131, 132, and 133 may represent years 2012, 2013, and 2014 respectively. Business promotion BO 122 may have a business promotion period from Apr. 14, 2012 to Jan. 23, 2013. Thus, BO 122 may be presented as a horizontal bar extending from start point 122.1 positioned below time period 131 to end point 122.2 positioned below time period 132. The start point 122.1 may line up with a point in the time period 131 which approximately corresponds to Apr. 14, 2012, and the end point 122.2 may line up with a point in the time period 132 which approximately corresponds to Jan. 23, 2013.

In an example embodiment, multiple scales 102 and 104 may be presented on the GUI 100 and the BO visual representations 122, 124, and 126 may be presented relative to the multiple scales. For example, time periods 134, 135, and 136 may represent the first half of year 2012, the second half of year 2012, and the first half of year 2013 respectively. Business promotion BO 122 may have a business promotion period from Apr. 14, 2012 to Jan. 23, 2013 as described previously. Thus, BO 122 may be presented as a horizontal bar extending from start point 122.1 positioned below time periods 131 and 134 to end point 122.2 positioned below time periods 132 and 136. The start point 122.1 may line up with points in the time periods 131 and 134 which approximately correspond to Apr. 14, 2012, and the end point 122.2 may line up with points in the time periods 132 and 136 which approximately correspond to Jan. 23, 2013.

In an embodiment, the GUI 100 may include multiple axes and one or more scales on each of the multiple axes. Each axis (and the associated scale(s)) may represent different BO attributes. Thus, the BO(s) presented on the GUI 100 may be presented relative to the scale(s) on each axis. For example, the scale(s) on an x-axis may represent time periods and the scale(s) on a y-axis may represent price ranges. Consequently, the bars 122, 124, and 126 representing BOs such as business promotion BOs may be displayed based on the BOs' respective business promotion periods and business promotion prices.

The length of the bars 122, 124, and 126 may correspond to the business promotion period, and the width of the bars 122, 124, and 126 may correspond to the business promotion price. Similarly, BOs may be displayed relative to three axes by displaying the BOs as 3D bars and varying the length, width, and depth of the bars to correspond to the scale(s) on the three axes.

Figure 2:
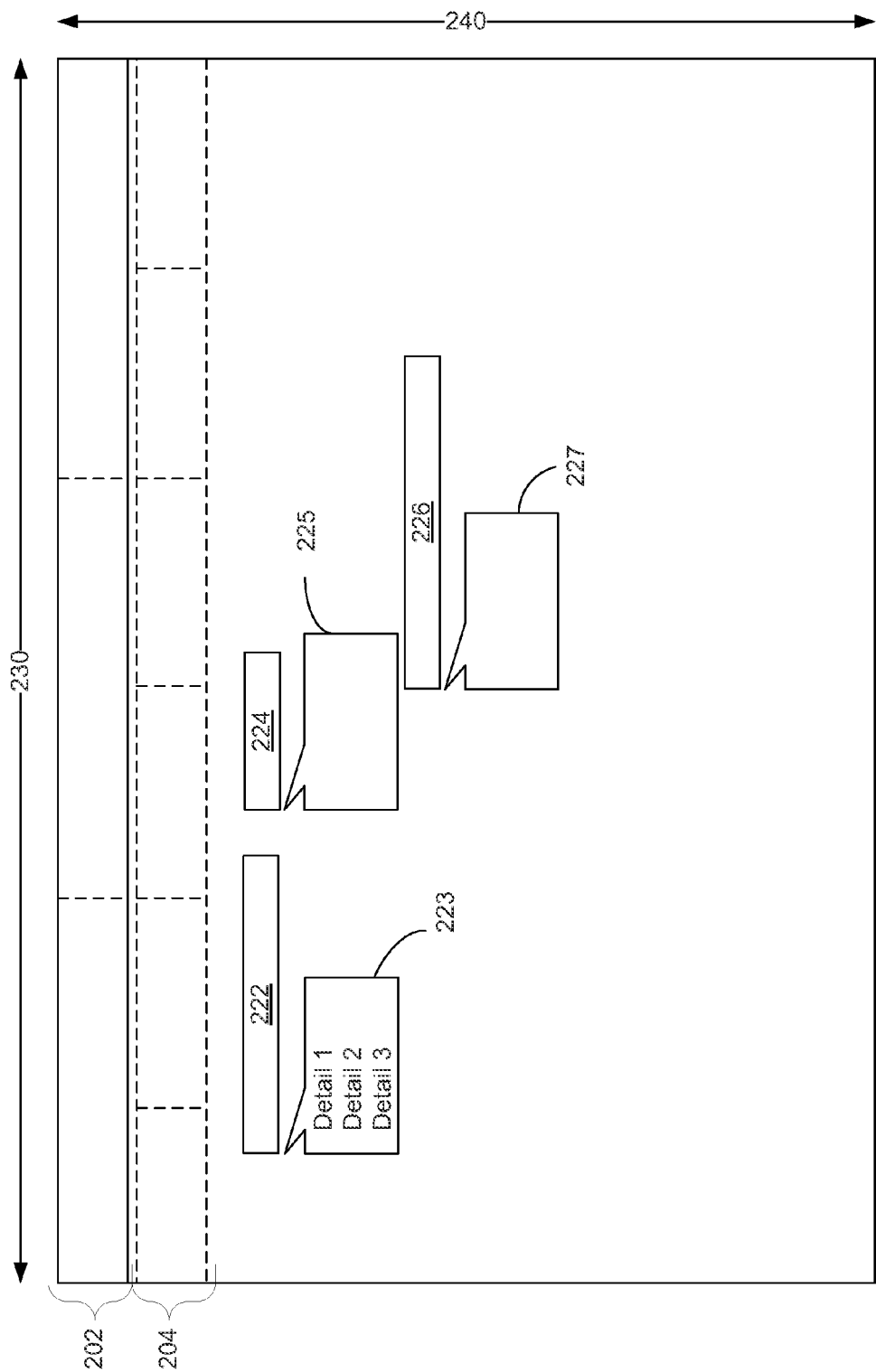
FIG. 2 illustrates a GUI to display BOs according to an embodiment.

FIG. 2 illustrates a GUI 200 to display BOs according to an embodiment. In an embodiment, BOs may be displayed on a GUI 200 in an organized manner to visually convey information about the BOs. The GUI 200 may display one or more scales 202 and 204 on the x-axis 230 and/or y-axis 240. The GUI 200 may display visual representations of BOs such as 222, 224, and 226 mapped in relationship to the attributes on the x-axis 230 and/or y-axis 240 as discussed in the description pertaining to FIG. 1 above. The GUI 200 may display detail boxes 223, 225, and 227 which present details about BOs associated with BO visual representations 222, 224, and 226 respectively.

In an embodiment, the detail boxes 223, 225, and 227 may display attributes and/or other metadata associated with the respective BOs. The information presented in the detail boxes 223, 225, and 227 may be customized through GUI 200 and/or another GUI so that only the required details are displayed. In an embodiment, the size of the detail boxes 223, 225, and 227 may be customized through GUI 200 and/or another GUI to tweak the readability of the information presented in the detail boxes. In an embodiment, the user may be able to dynamically change the size of a detail box by, for example, selecting the border(s) of the detail box and dragging the border(s) of the detail box to a desired position. The user may select and drag the border(s) of the detail box by, for example, his/her finger (when utilizing a touch screen), a mouse, keyboard, trackball, etc. In an embodiment, all detail boxes 223, 225, and 227 may be displayed without the need for a user to perform any actions on BO visual representations 222, 224, and 226. Specifically, the detail boxes may be displayed without the need for the user to click on or hover a cursor over the BO visual representations 222, 224, and 226.

In a further embodiment, a toggle switch (not shown) may be presented on the GUI 200 to turn on/off the display of detail boxes. Activating the toggle switch when the detail boxes are displayed may remove all detail boxes 223, 225, and 227 from the GUI 200. In addition, the BO visual representations 222, 224, and 226 may be repositioned on the GUI 200 to better utilize the space realized from not displaying the detail boxes 223, 225, and 227. Activating the toggle switch when the detail boxes 223, 225, and 227 are not displayed may re-display the detail boxes 223, 225, and 227 again. A person having ordinary skill in the art will appreciate that the toggle switch may be implemented in many ways including a button, radio buttons, check boxes, drop down menus, etc. In an embodiment, the toggle switch may not be presented on the GUI 200, but may be implemented through output from a motion sensor within the device displaying the GUI 200. For example, shaking and/or tilting a PC tablet in a particular manner may toggle the display of detail boxes.

Figure 3:
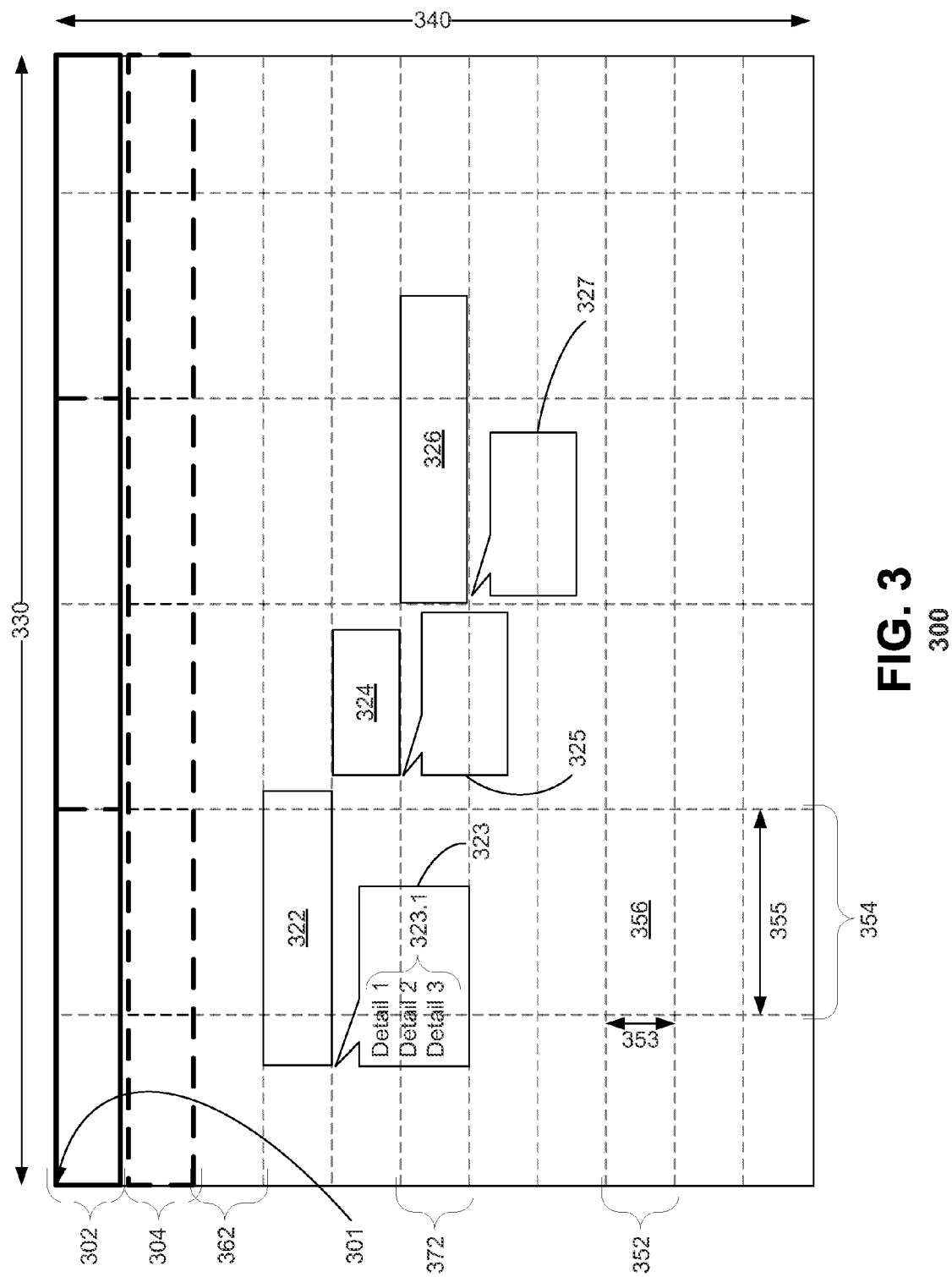
FIG. 3 illustrates a GUI to display BOs according to an embodiment.

FIG. 3 illustrates a GUI 300 to display BOs according to an embodiment. In an embodiment, BOs may be displayed on GUI 300 in an organized manner to visually convey information about the BOs. The GUI 300 may display one or more scales 302 and 304 on the x-axis 330 and/or y-axis 340. The GUI 300 may display visual representations of BOs such as 322, 324, and 326 mapped in relationship to the attributes on the x-axis 330 and/or y-axis 340 as discussed in the description pertaining to FIG. 1 above. The GUI 300 may display detail boxes 323, 325, and 327 which present details about BOs associated with BO visual representations 322, 324, and 326 respectively as discussed in the description pertaining to FIG. 2 above.

In an embodiment, the information presented on GUI 300 may be drawn and/or rendered based on a coordinate system. In an embodiment, the visual information may be drawn based on a Cartesian coordinate system using absolute values (i.e., (x,y) coordinates without regard to the sign of x or y). In an embodiment, a corner, such as the top left corner 301 of the GUI 300 may represent the origin (0,0) of the coordinate system. The information presented on the GUI 300 may be drawn by using the origin 301 as a reference point.

In an embodiment, the scales 302 and 304 may be drawn relative to the reference point 301. The drawing of scales 302 and 304 may be determined by calculating the point of placement (i.e., (x,y) coordinates) of the top left corner (or origin) of the scales 302 and 304, and the dimensions (i.e., the width and height) of the scales 302 and 304. For example, the point of placement of the origin of scale 302 may be (0,0), the width may be 1920 pixels, and the height may be 50 pixels. Similarly, the point of placement of the origin of scale 304 may be (0,50) since scale 304 is right below scale 302, the width may be 1920 pixels, and the height may be 50 pixels. In an embodiment, the above information such as origin and dimensions may be provided via a programming language (dynamically or statically), and upon execution of the programming language, the scales 302 and 304 may be drawn on the GUI 300.

In an embodiment, the GUI 300 may be divided into rows such as 352 and columns such as 354. A column or row may be referred to as a tile map entity. The intersection of a row and a column such as 356 may be referred to as a tile. The rows and columns may be positioned based on the coordinate system discussed above. In an embodiment, the rows and columns may not be displayed on the GUI 300, but may be used to draw information on GUI 300 such as visual representations 322, 324, and 326, and their associated detail boxes 323, 325, and 327. In an embodiment, the height 353 of all rows in GUI 300 may be equal and the width 355 of all columns in GUI 300 may be equal. The row height 353 may be dynamically determined based on the content displayed on GUI 300.

In an embodiment, details of the tile map entities from GUI 300 may be recorded in a cache and/or table 400 as illustrated in FIG. 4. The cache 400 may be keyed by a tile map entity identifier 402. The tile map entity identifier 402 may be a shorthand identifier such as the tile map entity's position appended to the tile map entity type. For example, the first row 362 from GUI 300 may be keyed by an identifier such as "1_R" (422). A column may be keyed by the attribute value where the column begins (such as a calendar date value) and the attribute value where the column ends. In an embodiment, the cache 400 may include the tile map entity type 404 of each tile map cache entry. The tile map entity type may indicate whether an entry is a row or a column. In an embodiment, the cache 400 may include the tile map entity origin 406 of each tile map cache entry. The tile map entity origin may indicate the coordinates of a predetermined point such as the top left corner of the tile map entity. For example, the cache 400 may include information which indicates that the origin of the first row 362 is 0,100 (426). In an embodiment, the cache 400 may include the tile map entity dimensions 408 of each tile map cache entry. The tile map entity dimensions may indicate the width and height of the tile map entity. For example, the cache 400 may include information which indicates that the width of the first row 362 is 1920 pixels and that the height is 50 pixels (428). In an embodiment, the cache 400 may include the tile map entity start/end attribute values 412 of each tile map cache entry. The tile map entity start/end attribute values may indicate the attribute values relative to a scale displayed on GUI 300. For example, a column cache entry may indicate the attribute value where the respective column begins (such as a calendar date value) and the attribute value where the column ends.

In an embodiment, prior to drawing/rendering each BO visual representation on GUI 300 the origin and dimensions of each BO representation and corresponding detail boxes may be determined. In an embodiment, information needed for the placement of the BO visual representation/detail box may be retrieved from the cache 400. For example, a method may determine that the BO visual representation 326 may be drawn in row 372. Therefore, the method may look up the cache entry in cache 400 which corresponds to row 372. From the cache entry corresponding to row 372, the method may determine the y-coordinate of the origin of the BO representation 326 and the height of the BO representation 326. Similarly, the method may determine the column(s) in which the BO representation 326 should be placed. The method may then look up the cache entry or entries in cache 400 which correspond to the respective column(s) to obtain additional details which affect the drawing of the BO representation 326.

In an embodiment, based on the determinations discussed above, the BO visual representations 322, 324, and 326 may be drawn/rendered using user interface elements such as segmented control, button, rectangle, or any other usable and performance efficient shape. In an embodiment, functions triggered in response to a click, drag, tap, swipe, natural gesture, and/or special actions performed by the user may be assigned. For example, tapping on the BO visual representation 322 may display a chart with details pertaining to the BO visual representation. In an embodiment, the mapping between the functions and the user actions may be stored in a cache and/or database table. In an embodiment, label texts of the BO visual representations 322, 324, and 326 may be drawn. On certain platforms, such as the iPad, a label text may be drawn using labels to synchronize update of the user interface element representing the BO visual representation and the user interface element representing the BO representation's label. Doing so may prevent undesirable behavior such as labels asynchronously moving relative to the associated BO visual representation during user interface updates.

In an embodiment, based on the determinations discussed above, the BO detail boxes 323, 325, and 327 may be drawn/rendered using user interface elements such as segmented control, button, rectangle, or any other usable and performance efficient shape. In an embodiment, functions triggered in response to a click, drag, tap, swipe, natural gesture, and/or special actions performed by the user may be assigned. For example, in response to tapping a detail box via a touch screen, the detail box may be displayed larger so that the user can more easily view the information in the detail box. In an embodiment, the BO detail boxes may include dynamic content. Specifically, the details within the detail boxes may change based on the state of the underlying BO. In an embodiment, multiple details may be displayed within a single detail box. For example, detail box 323 may display three details 323.1 about the underlying BO. In an embodiment, each detail within the detail box 323 may be drawn as a label. In an embodiment, the content of each label may be truncated if the content does not fit within the respective detail box without wrapping. In an embodiment, a method may check the size of the label's detail box, determine how much of the label's content can fit within the detail box without wrapping, and algorithmically truncate the label to a size which fits the detail box if necessary.

In an embodiment, functions triggered in response to a click, drag, tap, swipe, natural gesture, and/or special actions performed by the user may be assigned to each label displaying content of a detail. For example, tapping a label via a touch screen may display a non-truncated version of the label. In an embodiment, the mapping between the functions and the user actions may be stored in a cache and/or database table. In an embodiment, one or more functions may be assigned to user actions associated with a single label. For example, one or more functions may be assigned to the label displaying "detail 1" within detail box 323, one or more functions may be assigned to the label displaying "detail 2" within detail box 323, and one or more functions may be assigned to the label displaying "detail 3" within detail box 323.

A person having ordinary skill in the art will appreciate that although the discussion above refers to the top left corner of the GUI 300, the BO visual representations, etc., as origins, any point within/on the border of the entities may be fixed as the origin in other embodiments. Thus, the calculations explained above may vary accordingly. The foregoing discussion refers to pixels as the unit for measuring dimensions such as the height and width of columns, rows, etc. However, any unit capable of measuring absolute/relative distance may be utilized in other embodiments. Similarly, although the above discussion illustrates drawing/rendering BO related information on a Cartesian coordinate system, the discussed principles may be applied to any other coordinate system including a Polar coordinate system, a cylindrical/spherical coordinate system, and a homogeneous coordinate system.

Figure 5:
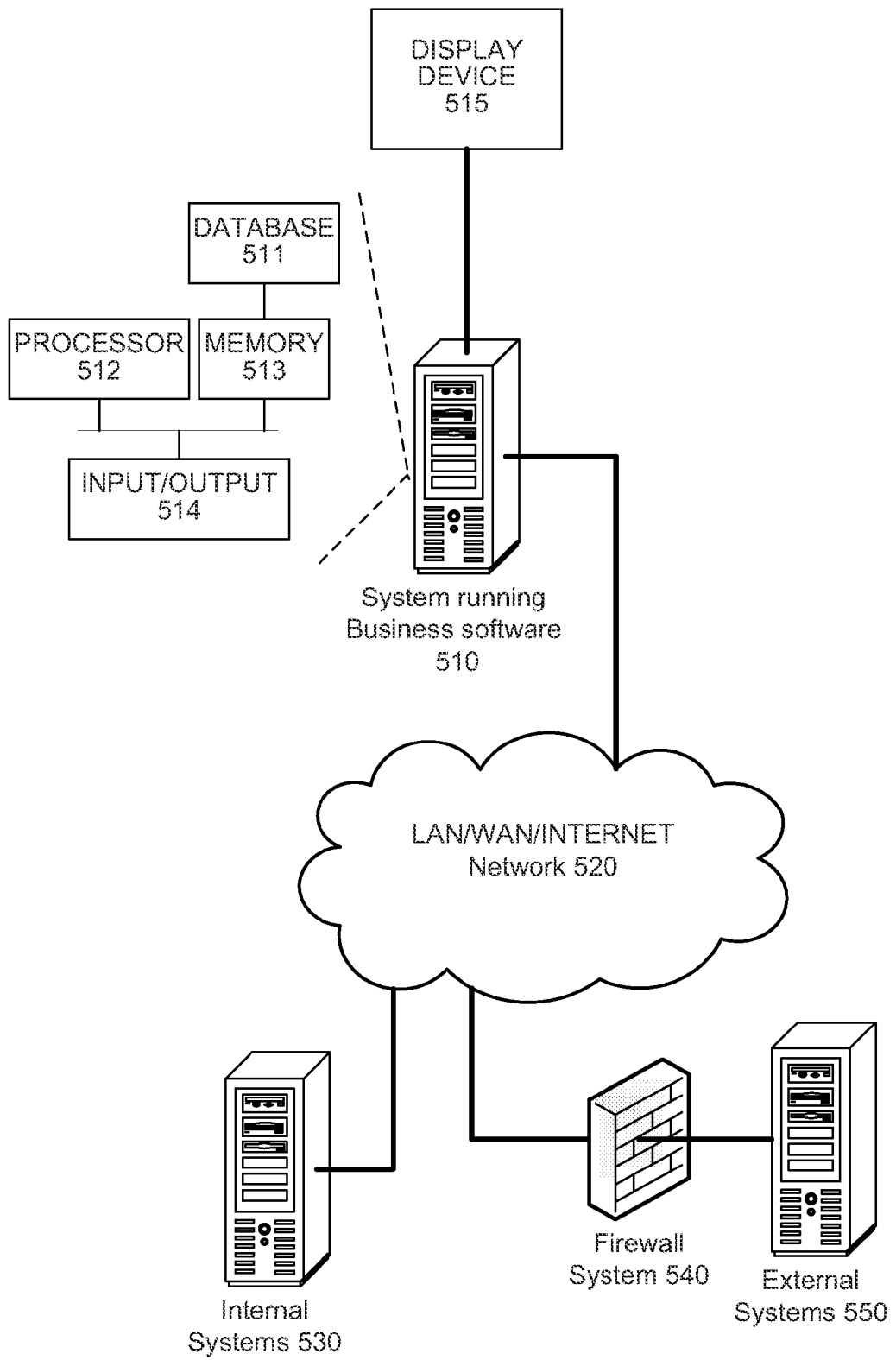
FIG. 5 shows an exemplary architecture in an embodiment of the invention.

FIG. 5 shows an exemplary architecture in an embodiment of the invention. The system running an application to view, create, or modify BOs 510 may be coupled to a display device 515, existing internal systems 530 through a network 520 and to external systems 550 through the network 520 and firewall system 540. The system running an application to view, create, or modify BOs 510 may include a desktop computer, laptop computer, tablet PC, client computer, mobile phone, central computer in a vehicle, any device with a touch screen, and any other computer. The display device 515 may include a computer monitor, a touch screen, a tablet PC screen, a mobile phone screen, and any other displays. The existing internal systems 530 may include a server and may provide business data and/or other data. The external systems 550 may include a server and may be maintained by a third party, such as an information service provider, and may contain business data and/or other data, that may be updated by the third party on a periodic basis. The system running an application to view, create, or modify BOs 510 may interact with these external systems to obtain updates through a firewall system 540 separating the internal systems from the external systems.

A person having ordinary skill in the art will appreciate that while internal systems 530 and external systems 550 are included in FIG. 5, in some embodiments, one or both of these systems may not be required. In an embodiment, the functionality provided by the internal systems 530 and external systems 550 may be provided by the system running the application to view, create, or modify BOs 510.

Each of the systems in FIG. 5 may contain a processing device 512, memory 513, a database 511, and an input/output interface 514, all of which may be interconnected via a system bus. In various embodiments, each of the systems 510, 530, 540, and 550 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 513 may contain different components for retrieving, presenting, changing, and saving data. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system.

Database 511 may include any type of data storage adapted to searching and retrieval. The database 511 may include SAP database (SAP DB), Informix, Oracle, DB2, Sybase, and other such database systems. The database 511 may include SAP's HANA (high performance analytic appliance) in-memory computing engine and other such in-memory databases.

Processing device 512 may perform computation and control functions of a system and comprises a suitable central processing unit (CPU). Processing device 512 may comprise a single integrated circuit, such as a microprocessing device, or may comprise any suitable number of integrated circuit devices and/or circuit boards working in cooperation to accomplish the functions of a processing device. Processing device 512 may execute computer programs, such as object-oriented computer programs, within memory 513.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A computer-implemented method comprising:
   determining, by a processor, a reference point on a graphical user interface, wherein the reference point is represented by a plurality of coordinates;
   displaying, on an electronic display, at least two scales on one axis of the graphical user interface, wherein a first scale is less granular than a second scale, both the first and second scales presenting a range of values associated with a business object attribute of a business object;
   dividing the graphical user interface into tile map entities, the tile map entities spanning the range of values provided on the first and second scales;

storing information about the tile map entities in a cache, wherein the stored information in the cache associated with each tile map entity includes an origin, dimensions, an entity identifier attribute, an entity type, and at least one of a start attribute value and an end attribute value, and wherein the origin is represented relative to the reference point, the entity identifier attribute comprising a shorthand identifier having a portion of a position of the tile map entity, and the entity type indicates placement of the tile map entity in a row or a column;

retrieving, from the cache, the stored information needed to position a business object visual representation and data related to the business object; and drawing the business object visual representation on the graphical user interface based on the retrieved information needed to position the business object visual representation relative to the two scales;

assigning at least one function to at least one user action associated with the business object visual representation, wherein the at least one function is executed in response to the at least one user action;

wherein the business object visual representation visually conveys the business object attribute of the business object based on the data related to the business object, the data related to the business object including: an origin and dimensions of the business object visual representation.

2. The method of claim 1, further comprising:

in response to detecting physical movement of the electronic display, retrieving, from the cache, content and position information for a detail box corresponding to the business object visual representation, and drawing the detail box on the graphical user interface based on the retrieved information, wherein the physical movement comprises at least one of shaking or tilting the apparatus.

3. The method of claim 2, further comprising:

drawing at least one label corresponding to each detail associated with the detail box.

4. The method of claim 3, wherein the at least one label is truncated based on dimensions of the detail box.

5. The method of claim 3, further comprising:

assigning at least one function to at least one user action associated with the at least one label, wherein the at least one function is executed in response to the at least one user action.

6. A computer-implemented method comprising:

determining, by a processor, a reference point on a graphical user interface, wherein the reference point is represented by a plurality of coordinates;

displaying, on an electronic display, at least two scales on one axis of the graphical user interface, wherein a first scale is less granular than a second scale, both the first and second scales presenting a range of values associated with a business object attribute of a business object;

dividing the graphical user interface into tile map entities, the tile map entities spanning the range of values provided on the first and second scales;

storing information about the tile map entities in a cache, wherein the stored information in the cache associated with each tile map entity includes an origin, dimensions, an entity identifier attribute , an entity type, and at least one of a start attribute value and an end attribute value, and wherein the origin is represented relative to the reference point, the entity identifier attribute comprising a shorthand identifier having a portion of a position of the tile map entity, and the entity type indicates placement of the tile map entity in a row or a column;

retrieving, from the cache, the stored information needed to position a business object visual representation and data related to the business object; and drawing the business object visual representation on the graphical user interface based on the retrieved information needed to position the business object visual representation relative to the two scales, wherein the business object visual representation visually conveys the business object attribute of the business object based on the data related to the business subject, the data related to the business object including: an origin and dimensions of the business object visual representation.

7. The method of claim 6, further comprising:

assigning at least one function to at least one user action associated with the business object visual representation, wherein the at least one function is executed in response to the at least one user action.

8. The method of claim 6, further comprising:

in response to detecting physical movement of the electronic display, retrieving, from the cache, content and position information for a detail box corresponding to the business object visual representation, and drawing the detail box on the graphical user interface based on the retrieved information, wherein the physical movement comprises at least one of shaking or tilting the apparatus.

9. An apparatus comprising:

a display to:
　display a graphical user interface; and
　display at least two scales on one axis of the graphical user interface, wherein a first scale is less granular than a second scale, both the first and second scales presenting a range of values associated with a business object attribute of a business object;

a processor to:
　determine a reference point on the graphical user interface, wherein the reference point is represented by a plurality of coordinates,
　divide the graphical user interface into tile map entities, the tile map entities spanning the range of values provided on the first and second scales;
　store information about the tile map entities in a cache, wherein the stored information in the cache associated with each tile map entity includes an origin, dimensions, an entity identifier attribute, an entity type, and at least one of a start attribute value and an end attribute value, and wherein the origin is represented relative to the reference point, the entity identifier attribute comprising a shorthand identifier having a portion of a position of the tile map entity, and the entity type indicates placement of the tile map entity in a row or a column,
　retrieve, from the cache, the stored information needed to position a business object visual representation and data related to the business object,
　draw the business object visual representation on the graphical user interface based on the retrieved information needed to position the business object visual representation relative to the two scales, wherein the business object visual representation visually conveys the business object attribute of the business object based on the data related to the business object, the data related to the business object including: an origin and dimensions of the business object visual representation.

10. The apparatus of claim 9, wherein the processor is further configured to:
    assign at least one function to at least one user action associated with the business object visual representation, and
    execute the at least one function in response to the at least one user action.

11. The apparatus of claim 9, wherein the processor is further configured to:
    in response to detecting physical movement of the apparatus, retrieve, from the cache, content and position information for a detail box corresponding to the business object visual representation, and draw the detail box on the graphical user interface based on the retrieved information,
    wherein the physical movement comprises at least one of shaking or tilting the apparatus.

12. The apparatus of claim 11, wherein the processor is further configured to:
    draw, on the graphical user interface, at least one label corresponding to each detail associated with the detail box.

13. The apparatus of claim 12, wherein the processor is further configured to:
    truncate, prior to the drawing, the at least one label based on dimensions of the detail box.

14. The apparatus of claim 12, wherein the processor is further configured to:
    assign at least one function to at least one user action associated with the at least one label, and
    execute the at least one function in response to the at least one user action.

15. A non-transitory computer-readable medium embodied with computer-executable instructions for causing a computer to execute instructions, the computer instructions comprising:
    determining a reference point on a graphical user interface, wherein the reference point is represented by a plurality of coordinates;
    displaying at least two scales on one axis of the graphical user interface, wherein a first scale is less granular than a second scale, both the first and second scales presenting a range of values associated with a business object attribute of a business object;
    dividing the graphical user interface into tile map entities, the tile map entities spanning the range of values provided on the first and second scales;
    storing information about the tile map entities in a cache, wherein the stored information in the cache associated with each tile map entity includes an origin, dimensions, an entity identifier attribute, an entity type, and at least one of a start attribute value and an end attribute value, and wherein the origin is represented relative to the reference point, the entity identifier attribute comprising a shorthand identifier having a portion of a position of the tile map entity, and the entity type indicates placement of the tile map entity in a row or a column;
    retrieving, from the cache, the stored information needed to position a business object visual representation;
    drawing the business object visual representation on the graphical user interface based on the retrieve information needed to position the business object visual representation relative to the two scales,
    wherein the business object visual representation visually conveys the business object attribute of the business object based on the data related to the business object, the data related to the business object including: an origin and dimensions of the business object visual representation.

16. The computer-readable medium of claim 15, further comprising:
    assigning at least one function to at least one user action associated with the business object visual representation, wherein the at least one function is executed in response to the at least one user action.

17. The computer-readable medium of claim 15, wherein the first and second scales are timescales.

18. The computer readable medium of claim 15, further comprising:
    in response to detecting physical movement of the electronic display, retrieving, from the cache, content and position information for a detail box corresponding to the business object visual representation, and drawing the detail box on the graphical user interface based on the retrieved information,
    wherein the physical movement comprises at least one of shaking or tilting the apparatus.

19. The computer-readable medium of claim 18, further comprising:
    drawing at least one label corresponding to each detail associated with the detail box.

20. The computer-readable medium of claim 19, wherein the at least one label is truncated based on dimensions of the detail box.

21. The computer-readable medium of claim 19, further comprising:
    assigning at least one function to at least one user action associated with the at least one label, wherein the at least one function is executed in response to the at least one user action.

* * * * *